United States Patent [19]

Keane

[11] 4,417,985

[45] Nov. 29, 1983

[54] TREATMENT OF WATERS WITH BROAD SPECTRUM CONTAMINANTS

[76] Inventor: James Keane, 23, S. Harlan St., York, Pa. 17402

[21] Appl. No.: 318,820

[22] Filed: Nov. 6, 1981

[51] Int. Cl.$^3$ ............................................. C02F 1/54
[52] U.S. Cl. ................................... 210/707; 210/727; 210/758; 210/221.1; 261/123
[58] Field of Search ............................... 210/704–707, 210/727, 758, 198.1, 220, 221.1, 221.2; 261/76, 77, 93, 123, DIG. 25

[56] References Cited

U.S. PATENT DOCUMENTS

| | | | |
|---|---|---|---|
| 3,239,461 | 3/1966 | Sebba | 210/704 |
| 3,583,909 | 6/1971 | Block | 210/705 |
| 3,642,617 | 2/1972 | Brink et al. | 210/704 |
| 3,853,616 | 12/1974 | Rundell et al. | 210/727 X |
| 3,875,046 | 4/1975 | Rosenbloom | 208/11 |
| 3,900,420 | 8/1975 | Sebba | 210/758 X |
| 3,959,131 | 5/1976 | Ramirez et al. | 210/707 |
| 3,969,245 | 7/1976 | Ramirez | 210/707 |
| 3,969,446 | 7/1976 | Franklin, Jr. | 261/77 X |
| 3,975,269 | 8/1976 | Ramirez | 210/707 |
| 4,046,669 | 9/1977 | Blaine et al. | 208/11 LE |
| 4,057,485 | 11/1977 | Blaine et al. | 208/11 LE |
| 4,067,796 | 1/1978 | Alford et al. | 208/11 LE |
| 4,085,041 | 4/1978 | Fullerton et al. | 210/706 X |
| 4,174,263 | 11/1979 | Veatch et al. | 208/11 LE |
| 4,198,294 | 4/1980 | Deane | 210/704 X |
| 4,203,837 | 5/1980 | Hoge et al. | 210/705 |
| 4,217,202 | 8/1980 | Paraskos et al. | 208/11 LE |

FOREIGN PATENT DOCUMENTS

708215 4/1965 Canada.

Primary Examiner—Robert H. Spitzer
Attorney, Agent, or Firm—Charles E. Brown

[57] ABSTRACT

Industrial waters containing dissolved or suspended contaminants are treated by turbulently mixing the contaminated water with a composition comprising a discontinuous phase of gas in the form of spherical bubbles having a narrowly distributed size of at least about 12 microns and each encapsulated in a double surfaced hydration layer containing water and a soluble surfactant having a HLB ratio greater than about 10, the encapsulated gas bubbles being dispersed in a continuous water phase and each having on the outer surface of the hydration layer a layer of collector ions active to react with the contaminants. The surfactant is present in an amount to stabilize the bubbles and to impart to the hydration layer sufficient thickness and viscosity to retard migration of the collector ions through the hydration layer for a period of time sufficient to enable the collector ions to react with the contaminants and cause nucleation thereof directly at the surface layers of the bubbles. The reaction between the collector ions and the contaminants causes the bubbles to rupture and to release their entrapped gas as naked gas bubbles and forms an insoluble reaction product, the ruptured bubbles exposing the surfactant contained in the respective hydration layer thereof for reaction with any unreacted collector ions to form a further insoluble reaction product. Both these reaction products are then allowed to separate from the water as a recoverable agglomerated material.

98 Claims, 11 Drawing Figures

TREATMENT OF WATERS WITH BROAD SPECTRUM CONTAMINANTS

The present invention lies in the field of industrial waste water treatment and is particularly directed toward treating waters containing complex wastes, such as industrial laundry wastes. More particularly, the invention relates to a composition for the direct nucleation of contaminants contained in a hydrogen-bonded liquid such as water, as well as to a method and apparatus for preparing same.

In most cases, an industrial waste water stream can be analyzed, predicted and even treated on a consistant basis. The discharge from an industrial laundry is not however. In practical terms, there is yet not technology to treat such type of discharge consistently, at reasonable cost, let alone recycle it. There are known waste water treatment systems which are aimed at specific ends, but none can handle the range of constituents, nor the range of variability that exists in industrial laundry wastes.

An industrial laundry supplies fabric cleaning and rental services for uniforms, wiper rags, mats, mops, air filtration bags, etc., in fact any cleaning or cleanup item required that is made of fabric. The filtration bags are a newer service product for these laundries, and in fact represent a transfer of an air pollution problem to one of water pollution. White linen or uniforms are not a part of their business, these are being done by a different class of laundry.

A typical industrial laundry has 20,000 to 200,000 gallons/day of discharge water. It can typically represent 0.2% of the hydraulic load on a municipal treatment plant, yet at the same time represent 15 to 20% of its treatment load. This load can be practically any oil, dirt or chemical that a customer list of 10,000 plants, typical for such an operation, can generate. The followin table shows just four typical customers from a single morning's run by a laundry sales truck:

TABLE

| Plant | Fabric Item | Contaminants |
|---|---|---|
| Printer | Wiper Rags | Ink |
| | | Metallic Pigments |
| | | Oil Base |
| | | Surfactants |
| | | Solvents |
| | | Toluene |
| | | Chlorinated |
| | | Oils |
| | | Lube Oil |
| | | Grease |
| Body Shop | Uniforms | Paint |
| | Wiper Rags | Body Filler Dust |
| | | Lube Oil |
| | | Solvents |
| Manufacturing | Mats | Mineral Oils |
| | Mops | Cutting Oils |
| | Wiper Rags | Synthetic Oils |
| | Uniforms | Metal particles |
| | | Floor wax |
| | | Cleaning Compounds |
| | | etc. |
| Research Company | Wipers | Confidential |

A typical day might be 50 such plants, and a typical laundry might have 20 such trucks. It is to be noted that the last entry, under research company, the contaminants are held confidential; often a waste item cannot be identified due to secrecy or more likely unwillingness of such companies to admit that it is. Thus, it can be seen that as many as 1000 plants can indirectly feed a vest unidentified waste stream to a municipal treatment plant.

It was observed during work with a micro-gas emulsion (MGE) of the type described in U.S. Pat. No. 3,900,420 to Sebba that concentrated waste waters with complex mixtures such as those found in industrial laundry waste could not be floated using MGE bubbles, but required much larger bubbles similar to those used in the ion flotation method described in Canadian Pat. No. 708,215 also to Sebba. Thus, MGE bubbles were made with a venturi generator according to the teaching of the Sebba patent and were introduced into a complex water waste stream containing a broad spectrum of contaminants. There was a very little separation of the contaminants from the water, although with different surfactants there was variation in the type of contaminants that was partially collected. At very high surfactant concentrations, the bubble size was indeed small with long persistance but there were relatively a few bubbles in the expected 1-10μ range (colloidal size). These concentrations were in the range of 1,000 to 3,000 p.p.m. which were entirely out of the practical economic range for waste water stripping. At lower values of surfactant additions, the bubble size was much larger but the number of bubbles in the range 1-10μ became extremely small. Further investigations revealed that these small bubbles had at very short life at surfactant concentrations at about the critical micelle concentration or below it. The remaining larger bubbles behaved as specific contaminant collectors very similar to the ion flotation teaching of the other Sebba patent, thus requiring the selection of specific surfactants. In no case did these bubbles collect other than a narrow range of contaminants and were not therefore useful in the particular range of applications to which the present invention pertains.

In considering the problem of scale-up of bubble forming systems, it became evident that the method of using a recirculating system with a time delay loop to select out the long life bubbles was not a practical approach, and further raised the question as to the nature of the short life bubbles that were rejected. For every gallon of bubbles produced, 10 gallons had to be circulated at high pressure drop through a venturi. The venturi was only effective around its periphery, so that as scale-up in size was attempted, it was found that bubble production was proportional to $\pi d$ where d is the active throat diameter, whereas the recirculation load on the pump was proportional to $(\pi d^2)/4$. Clearly, when using a venturi-type bubble generator, large increases in capacity of bubble production would not be possible and still retain an economic power input per unit bubble area produced.

It is an object of the present invention to clean contaminated waters containing a broad spectrum of contaminants, in an effective and economic manner.

According to one aspect of the invention, there is provided a composition for the direct nucleation of materials which are dissolved or suspended in a hydrogen-bonded liquid, which comprises a discontinuous phase of gas in the form of spherical bubbles having a narrowly distributed size of at least about 12 microns and each encapsulated in a double surfaced hydration layer containing the hydrogen-bonded liquid and a soluble surfactant having a HLB ratio greater than about 10, the encapsulated gas bubbles being dispersed in a continuous phase of the hydrogen-bonded liquid and each having an outer surface layer of collector ions movably held to the hydration layer by Coulomb forces and active to react with the materials. The surfactant is present in an amount up to about 3 times critical micelle concentration so as to stabilize the bubbles and impart to the hydration layer sufficient thickness and viscosity to retard migration of the collector ions through the hydration layer for a period of time sufficient to enable the collector ions to react with the materials and cause nucleation thereof directly at the surface layers of the bubbles.

It has been found that when the bubbles rupture as a result of the nucleation reaction at the surface layers and of the collector ions having migrated in time through the respective hydration layer of unreacted bubbles and reacted with the surfactant, they release their entrapped gas as naked gas bubbles which coalesce with other naked gas bubbles to provide large gas bubbles which are effective for flotation of the nucleated materials. Of course, if the materials contained in the hydrogen-bonded liquid are high density materials, the nucleated materials will drop under gravity to form a sediment layer instead of a floating floc. For the sake of simplicity, the encapsulated gas bubbles of the invention having a surface layer of nucleation centers formed of active collector ions will be hereinafter termed DNF (Direct Nucleate Flotation) bubbles; it must be understood, however, that such terminology does not limit in any way the application of these bubbles to the separation of nucleated materials only by flotation.

The spherical gas bubbles forming the DNF bubbles of the invention must have a narrowly distributed size of at least about $12\mu$ since it has been found that the lifetime of the DNF bubbles is strongly dependent on the size of the gas bubbles. Below about $12\mu$, they rapidly shrink and disappear. In the $12-15\mu$ range, they are extremely stable; the gas bubbles are static, that is, they neither grow nor shrink, and thus last for hours. Above about $15\mu$, the bubbles become dynamic, that is, they slowly increase in size. The bubbles sizes must also be narrowly distributed since a narrow distribution yields the best compromise between loss of bubbles due to uneconomically short life and loss of effective surface area due to uneconomically large bubbles. By the expression "bubbles having a narrowly distributed size" are meant those bubbles whose size is greater than one half or less than twice the size of the most frequently occuring bubbles and comprising about 68% of all the bubbles formed. The gas bubbles preferably have a narrowly distributed size in the range of from about 12 to about $100\mu$, where the half-life of such bubbles is from about 2 minutes to more than 2 hours. In the particularly preferred range of about 12 to about $20\mu$, the bubbles have half-lives of at least about one hour. The term "half-life" refers to the time it takes for a bubble to half or double its size (diameter).

The gas is generally air and may be present in an amount of up to about 80% by volume, preferably between about 5 to about 80% by volume.

The hydrogen-bonded liquid can be any liquid containing hydrogen bonds such as, for example, water, alcohols and glycols.

Where the hydrogen-bonded liquid is water, the surfactant can be any water soluble anionic, cationic or non-ionic surfactant having a HLB (Hydrophilic-Lipophilic-Balance) ratio greater than about 10, preferably of about 16 to about 18. A surfactant with a HLB ratio of above 10 necessary for effectively forming the required hydration layer. Such surfactants are preferably selected from the group consisting of akali metal and ammonium lauryl sulfates such as sodium lauryl sulfate (HLB:40) and ammonium lauryl sufate (HLB:18), polyoxyethylene derivatives of fatty acid partial esters of sorbitol anhydrides such as TWEEN 20 (trade mark; polyoxyethylene sorbitan monolaurate with HLB of 16.7) and surfactants based on alkylaryl polyether alcohols, sulfonates and sulfates such as TRITON X-100 (trade mark; isooctophenoxypolyethoxyethanol with HLB of 13.5).

The surfactant is present in an amount to stabilize the gas bubbles and also to impart to the hydration layer the required thickness and viscosity. In practice, this amount is usually at or slightly above (e.g. 10%) critical micelle concentration (CMC). This concentration of surfactant corresponds to the maximum depression of the gas to liquid interfacial tension which occurs when the surfactant forms a monolayer at the interface; this monolayer when it is completely formed will develop a deep hydration layer. The CMC for many surfactants is in the range of about 100 to about 300 p.p.m. It is also possible for the surfactant to be in an amount which is slightly less (e.g. 10%) than the CMC, in which case the gas bubbles are less stable and will more readily release their entrapped gas so as to assist in the flotation of the nucleated materials.

The double-surfaced hydration layer which covers each gas bubble is a "deep" layer which is known in the literature as having a thickness of about 10 to about 100 Å. As will be hereinbelow explained in greater detail, when the hydrogen-bonded liquid is water, this water is present in the hydration layer in the form of soft ice having a viscosity of the order of $10^4$ poises. This soft ice may comprise a plurality of successive layers of polarized water molecules. In the case where the amount of water soluble surfactant greatly exceeds the CMC, that is, when it reaches an amount up to about 3 times the CMC, the hydration layer will be multilayered and contain an innermost mono-molecular layer of surfactant and a double-molecular layer of surfactant spaced therefrom with an inner soft ice layer between the surfactant layers and an outermost soft ice layer surrounding the double-molecular layer of surfactant.

It has also been observed that when the hydration layer further contains an oil soluble surfactant, there exists a second critical size at about $25\mu$ where the bubbles rupture and then collapse. It has been further observed that when such DNF bubbles containing a mixture of water soluble surfactant and oil soluble surfactant (for example, in a weight ratio of about 1:1) rupture as a result of the nucleation reaction as the surface layers and of unreacted bubbles having a size above about 15 microns slowly increasing in size and reaching a size of about 25 microns, other unreacted bubbles also rupturing in time as a result of the collector ions having migrated through the respective hydration layer thereof and reacted with the water soluble surfactant, residual globules of the oil soluble surfactant with no residual gas core are formed which have a size of about 1 micron. These very small globules of oil soluble surfactant act as further collectors of any oil soluble materials present in the water, and thus advantageously serve to extend the range of materials to be collected.

The collector providing the collector ions is preferably present in an amount of about 100 to about 500 p.p.m. Such collector can be any suitable ionizable flocculating agent, coagulating agent or precipitating agent which is soluble in the hydrogen-bonded liquid. Where the hydrogen-bonded liquid is water, the collector can be selected from the group consisting of aluminum sulfate, alkali metal hydroxides and bicarbonates. Excellent results have been obtained with aluminum sulfate. The surface layer of collector ions has no bonding beyond the Coulomb forces holding it in place and the collector ions are thus movably held to the hydration layer. Where the layer of collector ions is positively or negatively charged, it acts as a Faraday cage to electrically screen the hydration layer.

The composition of the invention is prepared by a novel method which comprises the steps of:

(a) providing a flowing stream comprising a two phase mixture of the gas and a solution of a stabilizing amount of the surfactant in the hydrogen-bonded liquid;

(b) imparting to the stream a rotating laminar flow so as to form in the hydrogen-bonded liquid a plurality of micro-vortices centrifugally entrapping the gas therein and allowing the micro-vortices to break into surfactant-stabilized spherical gas bubbles, the micro-vortex forming being carried under conditions to provide bubbles having a narrowly distributed size of at least 12 microns;

(c) providing a time delay so as to allow the hydration layer to completely develop on each of the surfactant-stabilized gas bubbles formed;

(d) adding the collector providing the collector ions and allowing these ions to form a layer on the respective hydration layer of each surfactant-stabilized gas bubble.

In one preferred embodiment, the micro-vortex forming step (b) is carried out by subjecting the stream to micro-vortex forming and shedding means comprising a plurality of spaced apart substantially parallel stationary rods of circular cross-section disposed transversely to the direction of flow, under conditions to provide a Reynolds number in the range of from about 500 to about 5,000.

In another preferred embodiment, the micro-vortex forming step (b) is carried out by subjecting the stream to micro-vortex forming and shedding means comprising a plurality of radially arranged rods of circular cross-section rotating about a central axis and disposed transversely to the direction of flow, also under conditions to provide a Reynolds number in the range of from about 500 to about 5,000.

As will be seen hereinbelow, the Reynolds number is governed by the stream velocity upstream of the micro-vortex forming and shedding means, the viscosity of the liquid medium and the rod diameter and, at Reynolds numbers of about 500 to about 5,000, the size of the bubbles formed is nearly constant. It has also been determined empirically that with a rod diameter of at least 0.005 inch, the bubble size is at least about 12$\mu$. When using rods having diameters in the range of from about 0.005 to about 0.02 inch, the bubbles formed have a narrowly distributed size in the range of from about 12 to about 100$\mu$. The bubble size is of course related not only to the rod diameter but also to the amount of surfactant used and a decrease in the surfactant amount for a constant rod diameter will increase the size of the bubbles produced.

The useful total effective length defined by the rods is generally in the range of from about 100 to about 10,000 inches.

The time delay provided for allowing the hydration layer to completely develop on each of the surfactant-stabilized gas bubbles is preferably in the range of from about 10 to about 100 milliseconds.

The invention further provides an apparatus for carrying out a method as defined above, which comprises first feed means for providing the aforesaid flowing stream; micro-vortex forming and shedding means arranged in the flow path of the stream for imparting to the stream a rotating laminar flow so as to form the aforesaid micro-vortices; means for providing the required time delay; and second feed means for adding the collector.

According to another aspect of the invention, there is also provided a bubble generator for producing a mixture of surfactant-stabilized spherical gas bubbles having a narrowly distributed size and dispersed in a hydrogen-bonded liquid. This bubble generator comprises feed means for providing a flowing stream comprising a two phase mixture of the gas and a solution of a stabilizing amount of the surfacant in the hydrogen-bonded liquid; and micro-vortex forming and shedding means comprising a plurality of rods arranged in the flow path of the stream and disposed transversely to the direction of flow for imparting to the stream a rotating laminar flow so as to form in the hydrogen-bonded liquid a plurality of micro-vortices centrifugally entrapping the gas therein which brake into surfactant-stabilized spherical bubbles of a narrowly distributed size. The rods are adapted to provide a Reynolds number in the range of from about 500 to about 5,000.

According to yet a further aspect of the invention, there is provided a method of treating water containing dissolved or suspended materials to separate these materials therefrom, which comprises turbulently mixing the water with a composition as previously defined in which the hydrogen-bonded liquid is water so as to cause nucleation of the materials at the surface layers of the bubbles. The reaction between the collector ions and the materials causes the bubbles to rupture and to release their entrapped gas as naked gas bubbles and forms an insoluble reaction product, the ruptured bubbles exposing the surfactant contained in the respective hydration layer thereof for reaction with any unreacted collector ions to form a further insoluble reaction product, any unreacted bubbles also rupturing in time as a result of the collector ions having migrated through the respective hydration layer thereof and reacted with the surfactant to form the aforesaid further insoluble reaction product. Both the insoluble reaction product and further reaction product are then allowed to separate from the water as a recoverable agglomerated material.

In one preferred embodiment of the water treatment method of the invention, the treated water containing the insoluble reaction product and further insoluble reaction product is passed to a quiescent flotation chamber wherein both reaction products are allowed to separate as a floc which is buoyed to the surface of the water with large gas bubbles formed by the coalescence of the naked bubbles with one another.

In another preferred embodiment of the water treatment method, the treated water containing the insoluble reaction product and further insoluble reaction product is passed to a settlement chamber having a bottom, wherein at least the insoluble reaction product is allowed to separate under gravity to form a sediment layer at the bottom of the chamber.

Examples of complex wastes that can be treated according to the invention are industrial laundry waste with oils, greases, metals, dyes, detergents and water conditioning chemicals in highly solubilized form. Another example is a mixture of crude oil, clay and water, with or without surfactants used to solubilize the crude oil and various chemicals to condition the water. A further example is a mixture of clays and minerals such as phosphate slime, in which case the water treatment method is multi-staged where a DNF bubble mixture having a first collector is used to collect one specie of clay in a first stage, and another DNF bubble mixture with a second collector is used to collect the other species in a second stage.

The invention will now be further understood by the following detailed description of preferred embodiments thereof, with reference to the appended drawings, wherein.

Figure 1:
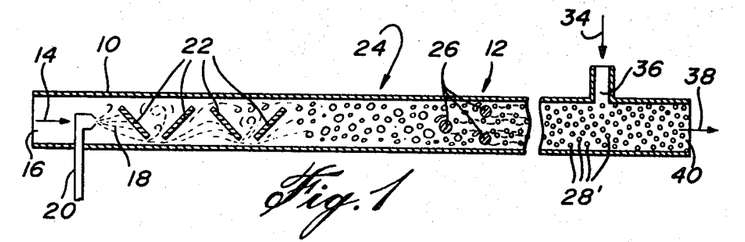
FIG. 1 schematically represents a DNF bubble generator according to a first preferred embodiment of the invention.

Referring to FIG. 1, there is shown a DNF bubble generator comprising a longitudinally extending conduit 10 for carrying a flowing stream, the conduit having a portion 12 thereof adapted to form and shed micro-vortices. An aqueous solution of surfactant 14 is fed at a controlled flow rate via the inlet 16, by means of a pump (not shown). Air 18, also controlled for flow rate and additionally for pressure, is introduced by means of the injector 20. Baffle plates 22 cause the stream to turbulently flow in the region 24 so as to ensure the formation of a uniform two phase mixture upstream of the micro-vortex forming and shedding portion 12 of the conduit. In the conduit portion 12, there is arranged a plurality of spaced apart substantially parallel stationary rods 26 of circular cross-section which are disposed transversely to the direction of flow. The rods 26 shed micro-vortices when the Reynolds number lies between 50 and 5,000. At a Reynolds number below 50, the flow does not separate for the surfaces of the rods, whereas above 5,000 the flow is turbulent.

Figure 2:
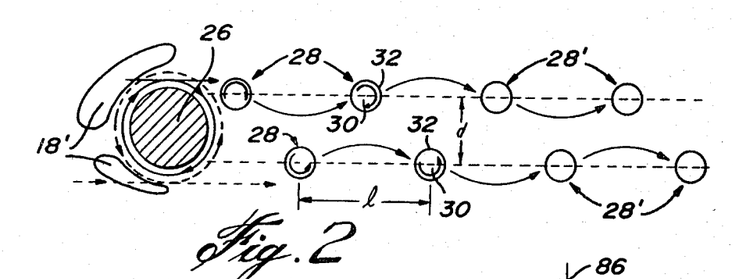
FIG. 2 is an enlarged schematic representation of a micro-vortex forming and shedding rod as used in the apparatus of FIG. 1, showing the formation of micro-vortices.

As best shown in FIG. 2, the rod 26 imports to the two phase mixture a rotating laminar flow which entrains the air bubbles 18' around the rod in both the clockwise and counterclockwise directions. As a result, a plurality of cylindrical micro-vortices 28 are formed which centrifugally entrap the air therein, each cylindrical micro-vortex having an air core 30 surrounded by a surfactant film 32. As shown, the micro-vortices 28 are formed in a pair of upper and lower layers which are spaced by the distance d and each have a sinusoidal wave motion, the respective micro-vortices of the upper and lower layers being spaced relative to one another by the distance l with the micro-vortices of one layer being disposed intermediate two successive micro-vortices of the other layer. Once a cylindrical micro-vortex 28 is formed and breaks away from the rod, frictional forces in the water will dissipate the rotational energy and the cylindrical micro-vortex will stop rotating. Before it does so however, the cylinder will become unstable and break up into short segments that close to form surfactant-stabilized air buffles 28'. It should be noted that the ratio d/l is an indicator of the stability of the micro-vortex forming and shedding process. At $d/l = 0.28$, optimum stability occurs which gives the least dispersion of bubble size and the greatest number of bubbles at the size determined by the parameters of the system.

Figure 4:
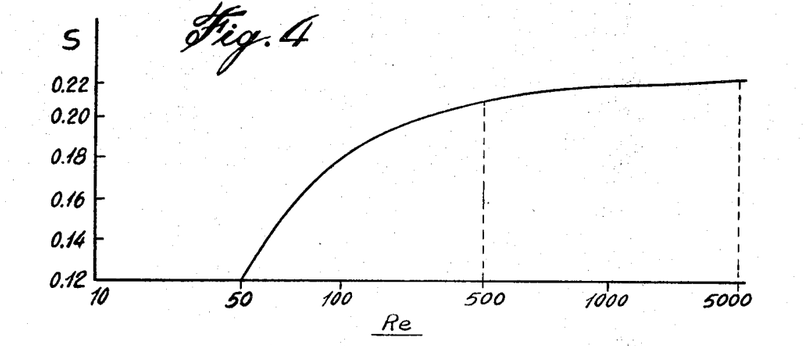
FIG. 4 is a diagram showing the relationship between the Reynolds number and the Strouhal number.

As is known, the distribution of the bubble size is related to the stream velocity Vo upstream of the micro-vortex forming and shedding region 12, to the viscosity V of the liquid medium and to the rod diameter D by the following relations:

Reynolds number $(Re) = (Vo\ D/V)$ and

Strouhal number $(S) = (n\ D/Vo)$ where n is the micro-vortex frequency defined by the ratio $2\ Vo/l$. The relationship between the Reynolds number and the Strouhal number is shown in FIG. 4, as published in "Fluid Dynamics", James W. Daily, Addison Wesley Pub., Reading, Mass., 1966, Library of Congress, number 65-23029, page 381. Over the range $Re = 50$ to 500, the bubble size is decreasing since the frequency n is increasing. Over the range $Re = 500$ to 5,000, the bubble size is nearly constant and thus by controlling the parameters Vo, V and D to have a Reynolds number in this range, the size of the bubbles produced will be restricted to a narrow size range.

Figure 5:
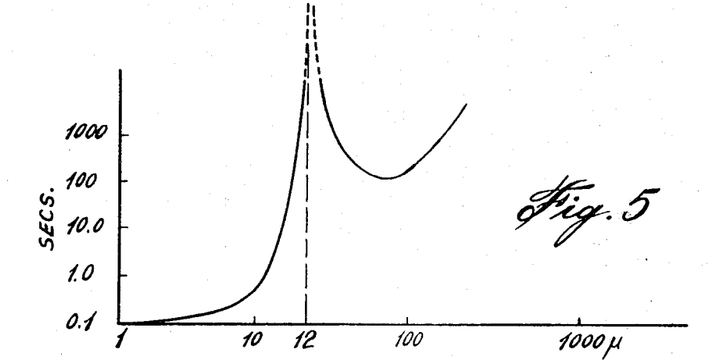
FIG. 5 is another diagram showing the relationship between the bubble half-life and the size thereof.

FIG. 5 shows that the half-life of the bubbles is a function of size. The critical lower size limit is at about $12\mu$, as below such size the bubbles rapidly shrink and disappear. In the $12-15\mu$ range, the bubbles are extremely stable and last for hours. The useful bubble sizes exhibiting adequate half-lives are therefore from about $12\mu$ upwards, with the micro-vortex forming and shedding parameters set to produce as many bubbles at the critical size as possible and as few below it as possible. This leads to an optimum selection for the maximum of a normal distribution curve to be set at about $15\mu$, with at least 95% of the bubbles produced being over $10\mu$. This in turn ensures the best compromise between loss of bubbles due to uneconomically short life, and loss of effective surface area due to uneconomically large bubbles.

In the conduit portion 12 of the DNF bubble generator illustrated in FIG. 1, several hundred rods 26 are provided so as to define a useful total effective length of about 100 to about 500 inches, preferably 200 to 300 inches. The surfactant-stabilized air bubbles 28' produced are then allowed to travel a length sufficient to provide the necessary time delay (about 10–100 milliseconds) for the desired hydration layer to completely develop, before a solution of collector 34 is added via the inlet 36. The resulting aqueous DNF bubble mixture 38 with collector ions forming the surface layers of the bubbles is discharged at the outlet 40 and is active for treating industrial waste waters.

As an example, if the DNF bubble generator just described is designed to convert 1 gallon/minute for an air and water mixture in a volume ratio of 1:1 to a DNF bubble mixture, the parameters of such a generator may be the following:

| Reynolds number | 500 |
|---|---|
| Micro-vortex shedding frequency | $51 \times 10^3$/sec. |
| Rod diameter | 0.005 inch |
| Total effective rod length | 100 inches |

The total active surface area available for treating waste waters and defined by the surfaces of the DNF bubbles produced is 1864 sq. ft./min. If the flow rate is increased to 100 gal./min., the Reynolds number increases to 5,000 and the total active surface area defined by the DNF bubbles becomes 18,640 sq. ft./min.

Figure 3:
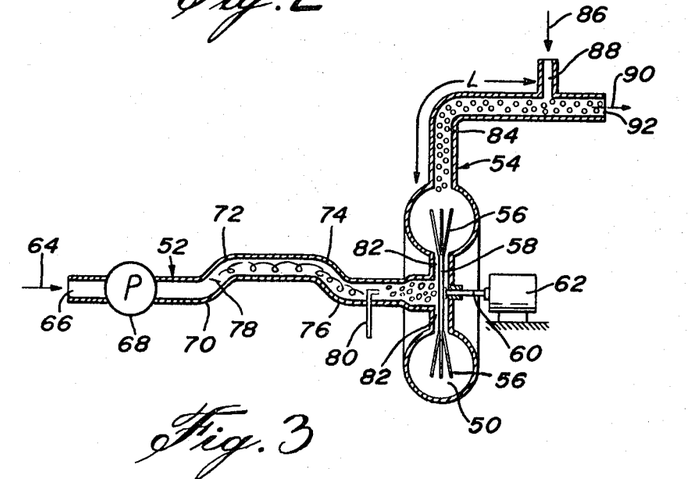
FIG. 3 is another schematic representation of a DNF bubble generator according to a second preferred embodiment of the invention.

FIG. 3 illustrates another embodiment of a DNF bubble generator. The apparatus illustrated comprises a micro-vortex chamber 50 to which are connected a feed conduit 52 and a discharge conduit 54. In the chamber 50, a plurality of rods 56 of circular cross-section and radially arranged for rotation about a central axis; they are supported by a circular mounting plate 58 which is connected to the rotor 60 of motor 62. An aqueous solution of surfactant 64 is introduced via the inlet 66 and is circulated into the system at a controlled flow rate by means of the pump 68. The feed conduit 52 is provided with four successive angularly bent portions 70, 72, 74 and 76, each of about 45°. The first angularly bent portion 70 serves to impart to the stream a counter-rotating double macro-vortex. A vane 78 is provided downstream of the first bent portion 70 whereby to select one of the macro-vortices of the double macro-vortex. The three other bent portions 72, 74 and 76 serve to increase the rotational velocity of the selected macro-vortex. For low Reynolds numbers, the selected macro-vortex has a direction of rotation which is the same as the direction of rotation of the rods 56, whereas for high Reynolds numbers the direction of rotation of the selected macro-vortex is opposite the direction of rotation of the rods 56.

Air is injected into the eye of the selected macro-vortex by means of the injector 80 immediately prior to the impingement on plate 58, resulting in a uniform two phase mixture in the region 82. As the mixture enters the chamber 50, it is radially dispersed by the rotating plate 58 and contacted by the rotating rods 56 which move transversely through the fluid. The micro-vortices are formed in the same manner as in the embodiment of FIG. 1 and schematically illustrated in FIG. 2. The surfactant-stabilized air bubbles 84 discharged from the chamber 50 are similarly allowed to travel a length L sufficient to provide the necessary time delay for the hydration layer to completely develop, before a solution of collector 86 is added via the inlet 88. The resulting aqueous DNF bubble mixture 90 is discharged at the outlet 92.

In the embodiment illustrated in FIG. 3, it is possible to arrange several thousand rods 56 such that the total effective length lies in the range of from about 1,000 to about 10,000 inches.

As previously mentioned, the hydration layer in which the gas bubble is encapsulated contains water and a surfactant. When the amount of surfactant is at or slightly above the critical micelle concentration, the surfactant forms a monolayer at the gas to water interface. Since water is polar, it will become oriented in the vicinity of the surfactant layer to form one or more layers of polarized water molecules. Such layers of polarized water molecules are known to be in a form of ice, called "soft ice", having a density of 1.1 as compared with 1.0 for free water and 0.9 for the crystalline ice formed on freezing ("Interfacial Phenomena", J. D. Davies and E. K. Rideal, Academic Press, 1961, page 364). The viscosity of "soft ice" is of the order of $10^4$ poises, decreasing away from the surface.

The properties of water when bound at a surface layer have been explored by several investigators. As noted above, the density of this water is 1.1 and its entropy of formation is 2.2 e.u. as compared with about 5 e.u. for ordinary ice. Perhaps the most striking evidence for the existance of this extremely dense water is the work of Dukhin and Shilov which have measured the dialectric constant of the water film ("Dielectric Phenomena and the Double Layer in Disperse Systems and Polyelectrolytes", trans. by D. Lederman, John Wiley and Sons, New York, 1974). The static value of the dialectric constant increases greatly as the layers of polarized water molecules form, when measured at low frequencies of the order of 10 Hz to 10 KHz. This shows that as in many systems such as quartz grains covered with a polar water layer, the relaxation time of the water molecules changes from that of water to that of ice as the layers of polarized water molecules form, and that each individual layer can be easily detected as it is formed.

Figures 6A, 6B:
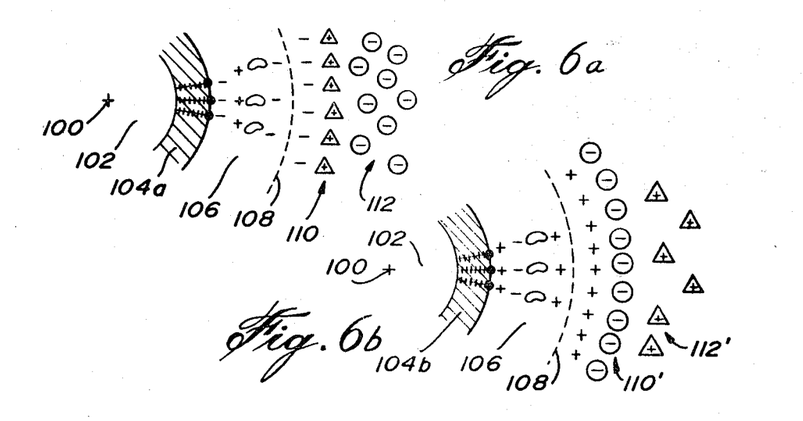
FIGS. 6a, 6b and 6c are fragmentary schematic representations of a DNF bubble with anionic, cationic and non-ionic surfactants, respectively.
Figure 6C:
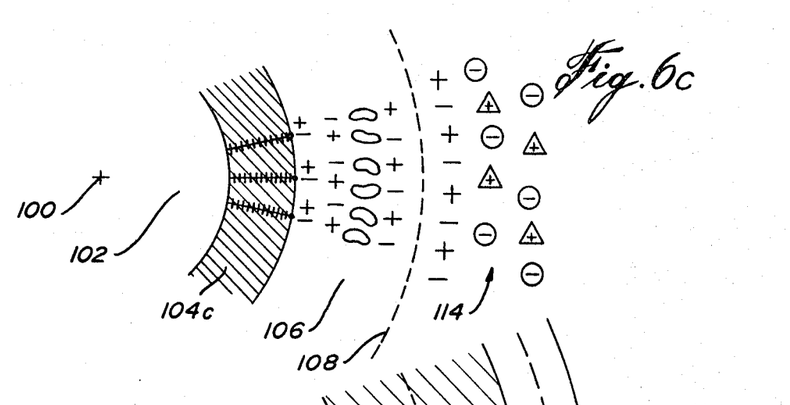

Given the existence of an extremely viscous region in the hydration layer, one can see that the migration of collector ions through such a layer would be substantially impeded. FIGS. 6a, 6b and 6c schematically illustrate the structure of a DNF bubble where the collector ions resulting from the dissociation of for example, alum ($Al_2(SO_4)_3 \cdot 18H_2O$) are represented by the symbols △ for $Al^{+3}$ and ⊖ for $SO_4^{-2}$. As seen in FIG. 6a, the DNF bubble with a center at 100 has a spherical air core 102 surrounded by a monolayer 104a of anionic surfactant. The negatively charged heads of the anionic surfactant molecules polarize the kidney-shaped water molecules (probability model) resulting in the formation of a soft ice layer 106. The polarized water molecules impart to the Stern layer 108 (defined by the transition layer between bound and unbound molecules) a negative charge which attracts the $Al^{+3}$ ions, resulting in the formation of a monolayer 110 thereof which is surrounded by a diffused layer or cloud 112 of the $SO_4^{-2}$ ions. It is to be noted that the stronger the charge of the surfactant heads is, the more layers 106 of polarized water molecules there would be and the longer would be the time delay until the collector ions reach the surfactant heads and react therewith.

Thus, the soft ice layer 106 allows a layer 110 of $Al^{+3}$ ions to form an exterior surface of an anionic surfactant-stabilized bubble, which is held in place temporarily by the soft ice and located perhaps 10 water molecule layers above the actual surfactant layer 104a.

Such an ionic layer would have no bonding beyond the Coulomb forces holding it in place. There would thus be a large tangential mobility for the collector ions so that the surface would tend to fill with like ions, and the oppositely charged ions would then form a cloud 112 outside this layer. It is to be further noted that these collector ions are physically located to directly nucleate whatever species of contaminant are introduced into the bubble region.

Exactly the same arrangement applies to the cationic surfactant-stabilized bubble represented in FIG. 6b and having a monolayer 104b of cationic surfactant, except that the negative $SO_4^{-2}$ ions would be attracted by the positively charged Stern layer instead of the $Al^{+3}$ ions, forming the monolayer 110'. The $Al^{+3}$ ions would then be in the cloud 112' around the bubble.

Similarly for the non-ionic surfactant-stabilized bubble shown in FIG. 6c and having a monolayer 104c of non-ionic surfactant, the layer 106 would consist of bound water molecules due to the combined charge in the surfactant heads and the hydrogen bonding that can form. In this case, the layer 114 of attracted ions would be a mixture, preserving the charge balance at neutral as is required.

Figure 7:
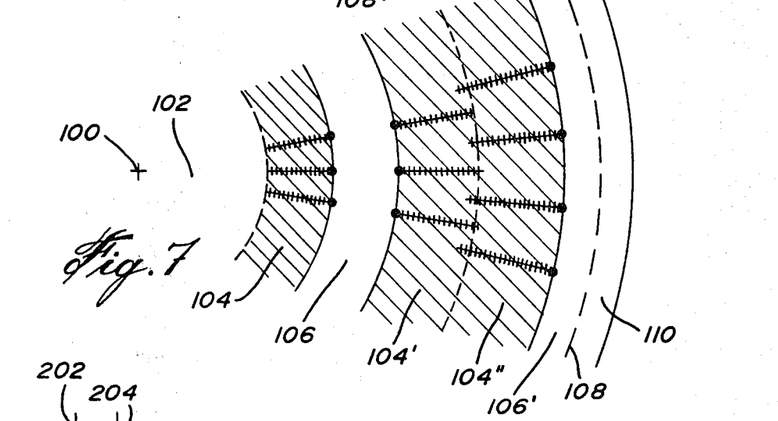
FIG. 7 is another fragmentary schematic representation of a DNF bubble having a multilayered hydration layer.

When the surfactant concentration is raised considerably above the critical micelle concentration so that sufficient surfactant is present to form much more surface area that is possible with the quantity of air present in the two phase mixture entering the micro-vortex forming and shedding system, then a plurality of layers of surfactant and soft ice can form. A DNF bubble with such an arrangement of layers is schematically represented in FIG. 7. The layers of surfactant always form in odd numbers due to the asymmetrical nature of the surfactant molecules. If, for instance, this surfactant has an oil soluble tail and a water soluble head then the gas to liquid interface would have a monolayer 104 of surfactant molecules interposed, with the oil soluble tails in the gas and water soluble heads in the water forming one soft ice layer 106. A second layer 104' of surfactant can now form outside the first by having the water soluble heads of this second layer immersed in the soft ice layer 106 outside the first surfactant layer 104 and oriented oppositely to it, with the oil soluble tails directed outwardly. The oil soluble tails cannot remain in the outwardly directed position unless there is a third layer 104" of surfactant molecules with their oil soluble tails inwardly directed, coexisting in an oily region formed by the tails themselves and having outwardly directed water soluble heads immersed in an additional soft ice layer 106'. Thus, one can make a bubble with a surfactant laden surface with one or three layers of surfactant with a soft ice layer associated with the heads of each surfactant layer.

It will be realized that it is not possible to make a bubble with two surfactant layers, with oil soluble tails, since the outer layer must necessarily have its surfactant tails either in the soft ice layer developed by the innermost surfactant layer or in the water surrounding the outermost surfactant layer; neither event is possible and the same discussion holds true for any even number of surfactant layers.

Such a bubble configuration has the very great advantage that it can withstand the disruptive effects of waste species to collector reaction or collector to surfactant reaction, thus delaying the destruction of the bubble and eventually providing much more surfactant which can be selected to have an affinity for specific species in the waste stream after the collector ions have been used up. The ability to deliver a controlled amount of collector followed by a controlled amount of surfactant as a specific ion collector is advantageous in the treatment of water containing large amounts of one specie of contaminant and smaller amounts of many others.

Figure 8:
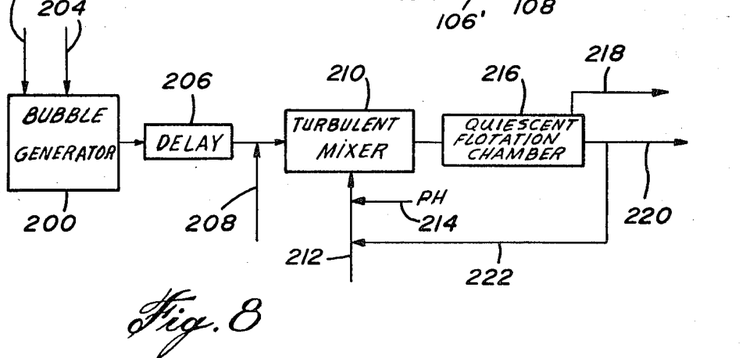
FIG. 8 is a flow diagram illustrating a waste water treatment method according to a preferred embodiment of the invention.

The application of the DNF bubbles to the treatment of industrial waste waters is schematically shown in FIG. 8. The flow diagram of FIG. 8 represents a single stage water treatment method. Surfactant-stabilized bubbles are produced by the bubble generator 200 which is fed with an aqueous solution of surfactant and air via feed lines 202 and 204. The bubble mixture produced is passed through a delay length 206 so as to allow the hydration layer to completely develop before the collector is added via line 208. The resulting DNF bubble mixture is passed to the turbulent mixer 210 where it is turbulently mixed with contaminated water which is fed via line 212. Prior to being mixed with the DNF bubble mixture, the pH of the contaminated water is adjusted by adding a suitable salt via line 214. The resulting mixture containing insoluble reaction products is passed to the quiescent flotation chamber 216 where the insoluble reaction products separate as a floc which is buoyed to the surface of the water by large flotation bubbles produced by the coalescence of smaller naked air bubbles which are released by the DNF bubbles upon rupturing. The floc is discharged via line 218 and clean water is recovered via line 220. A clean water recycle stream 222 can be provided to dilute the waste water so as to increase the effectiveness of the water stripping process, if required.

It has been observed that when the pH adjustment is performed with a particular salt such as sodium hydroxide and when the collector used is a salt which will coat the surfactant-stabilized bubbles and also react with the salt used to adjust the pH of the waste water, a water repellant floc results which is highly effective in removing waste water contaminants. Thus, if the pH adjust salt is sodium hydroxide and the collector is aluminum sulfate, and if the aluminum sulfate and sodium hydroxide are present in proportions to completely collect the waste species and react with each other residues, a water repellant floc will result which will remain stable for several hours to several days.

Experiments with benzene ring compounds from waste water residues used in the manufacture of dye intermediate compounds showed color concentration of +99%, but over two days, the dyes which were initially collected diffused out of the floc. This illustrates that if two types of collector are used together, then a water repellant floc can be obtained which is stable long enough to effect a separation of the waste species from the water.

Figure 9:
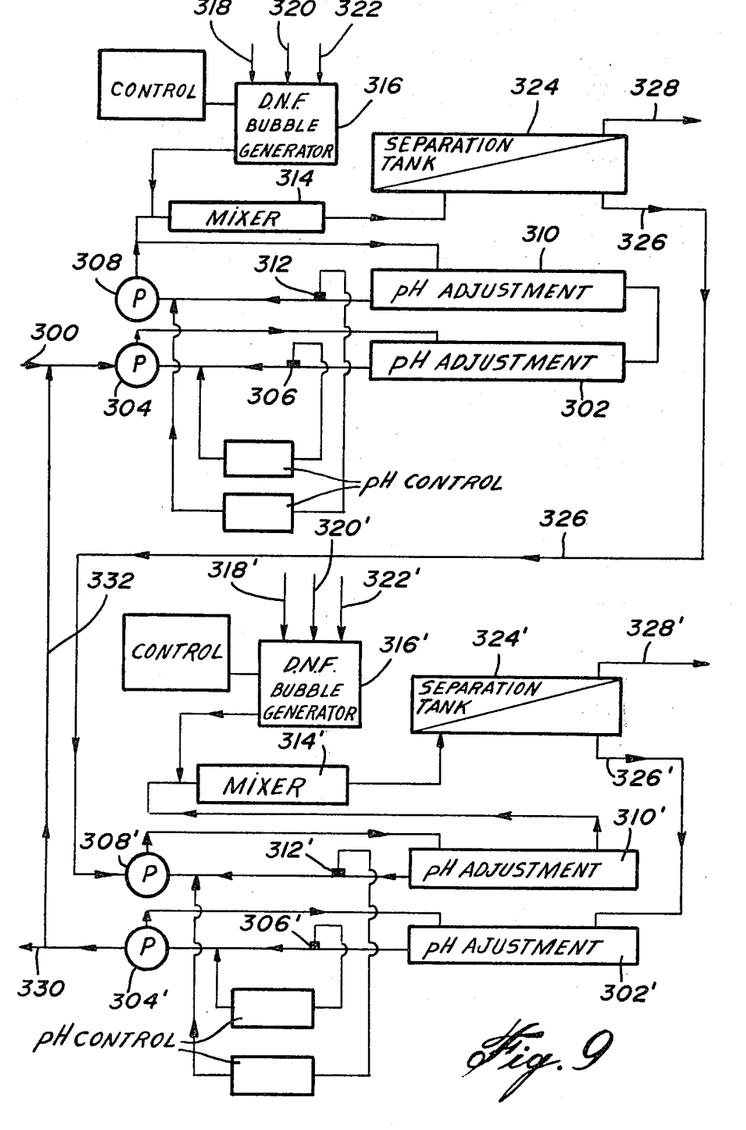
FIG. 9 is another flow diagram illustrating a two-stage waste water treatment method according to a further preferred embodiment of the invention.

FIG. 9 schematically illustrates the application of the DNF bubbles in a two-stage water treatment method. Waste water is fed via line 300 and is passed to the pH adjustment tank 302 where the pH is adjusted with a chemical addition to the inlet side of the circulating pump 304 from a signal provided by the pH probe 306. This pump recirculates the contents of tank 302 to mix the chemicals used for pH adjustment with the waste stream and to provide a time delay for the pH adjustment reactions to complete. Since a complex waste stream at high concentration often contains strong buffering agents, a second similar pump 308 and tank 310 with pH probe 312 are provided to adjust the pH a second time. The preferred chemical for the pH adjustment is NaOH and the pH point to which the adjustment is to be made is determined empirically for each waste stream, based on the results of flotation tests. The discharge of the tank 310 is passed to the turbulent mixer 314 where a DNF bubble mixture from the generator 316 is turbulently mixed with the waste stream. The DNF bubble generator 316 is an embodiment of the invention such as the one shown in FIG. 3, wherein an aqueous solution of surfactant, air and collector are fed via lines 318, 320 and 322, respectively. Following the mixer 314, the combined waste and bubble mixture streams are passed to the quiescent flotation tank 324 where separation is effected by the coalesced residual naked air bubbles left after the collector and waste species or the collector and surfactant have reacted and destroyed the DNF bubbles. The water is discharged as partially cleaned water via line 326 and the floc is discharged via line 328, containing a large portion of the contaminants.

The partly cleaned water is subjected to a second stage treatment and is passed via the line 326 to the tank 310', where pump 308' and pH probe 312' are used to effect a pH adjustment to a second pH value also found by empirical tests by means of flotation tests using the DNF bubble mixture. The presence of strong pH buffers in tank 310' is unlikely, so only one pH adjustment system would normally be used. The waste water partially cleaned and pH adjusted for the second time is fed to turbulent mixer 314' where it is combined with a DNF bubble mixture formed in a second DNF bubble generator 316' similar to generator 316 of the first stage. The choice of surfactants and collectors for generators 216' and 316' depend only on the characteristics of the waste stream and can be any combination of anionic, cationic or non-ionic surfactants or mixtures thereof in either generator independently of the other. Following a similar reaction series in the mixer 314' to that which occurred in the mixer 314 modified by the choice of surfactants and collectors, the combined waste and bubble mixture streams are passed to the quiescent flotation tank 324' where the cleaned water and a second floc residue are discharged via lines 326' and 328'. The cleaned water which exists via line 326' is passed to the tank 302' where the pH probe 306' and pump 304' effect a final pH adjustment, as required for the finally cleaned water which is discharged via line 330.

If alum is used as the collector or if a polyelectrolyte is used that like alum has a tendency to coat the interior surfaces of the system, then a system cleaning line 332 must be included. The inlet line 300 and outlet line 330 are closed when line 332 is open so that the entire water content of the system is recirculated. The pH probe 306, 312 or 312' is used to raise the pH so as to return any solids deposited on the interior surfaces to the solution state, from which they can be precipitated or collected and removed via the floc discharge lines 228' and 328' at a latter time.

The following non-limiting examples of preparation of DNF bubbles further illustrate the invention:

EXAMPLE 1

Use was made of a DNF bubble generator as illustrated in FIG. 1, with the following parameters:

| | |
|---|---|
| air/water ratio (volume) | 1:1 |
| surfactant | 300 p.p.m. of |

| | TRITON X-100 |
|---|---|
| Reynolds number | 500 |
| rod diameter | 0.005 inch |
| total effective rod length | 180 inches. |
| Collector | 100 p.p.m. of aluminum sulfate |

A DNF bubble mixture was obtained, in which the air bubbles had a size of about 12 to 20μ.

EXAMPLE 2

Use was made of the same DNF bubble generator as in Example 1 with the same parameters, except that the rod diameter was increased to 0.01 inch and the total effective rod length to 222 inches.

As a result, a DNF bubble mixture was obtained in the air bubbles had a size of about 20 to 30μ.

In order to obtain DNF bubbles having a narrowly distributed size in the range of from about 30μ to about 100μ, the rod diameter can be increased to about 0.02 inch or the amount of surfactant can be decreased from 300 to about 150 p.p.m.

EXAMPLE 3

Use was made of a DNF bubble generator as illustrated in FIG. 3, with the following parameters:

| | |
|---|---|
| air/water ratio (volume) | 1:1 |
| surfactant | 300 p.p.m. of TRITON X-100 |
| speed of pump | 1840 rev./min. |
| direction of macro-vortex | the same as that of the rotor |
| Reynolds number | 500–600 |
| rod diameter | 0.005 inch |
| total effective rod length | 3,500 inches |
| revolution speed of rotor | 1840 rev./min. |
| rotor size | 5 inches |
| time delay length | 2 feet |
| collector | 100 p.p.m. of aluminum sulfate |

20 gal./min. of a DNF bubble mixture were produced, in which the air bubbles had a size of about 12 to 20μ.

I claim:

1. A composition for the direct nucleation of materials which are dissolved or suspended in a hydrogen-bonded liquid, which comprises a discontinuous phase of gas in the form of surfactant-stabilized spherical bubbles having a narrowly distributed size in the range of from about 12 to about 100 microns and a half-life of at least about 2 minutes, each said gas bubble being encapsulated in a double surfaced hydration layer containing said hydrogen-bonded liquid and a soluble surfactant having a HLB ratio greater than about 10, said encapsulated gas bubbles being dispersed in a continuous phase of said hydrogen-bonded liquid and each having an outer surface layer of collector ions movably held to said hydration layer of Coulomb forces and active to react with said materials, said surfactant being present in an amount up to about 3 times critical micelle concentration so as to stabilize said bubbles and impart to said hydration layer sufficient thickness and viscosity to retard migration of said collector ions through said hydration layer for a period of time sufficient to enable said collector ions to react with said materials and cause nucleation thereof directly at said surface layers of said bubbles, whereby when said composition is turbulently mixed with said hydrogen-bonded liquid containing said materials dissolved or suspended therein, the reaction between said collector ions and said materials causes said bubbles to rupture and to release their entrapped gas as naked gas bubbles and forms an insoluble reaction product, said ruptured bubbles exposing the surfactant contained in the respective hydration layer thereof for reaction with any unreacted collector ions to form a further insoluble reaction product, any unreacted bubbles also rupturing in time as a result of said collector ions having migrated through the respective hydration layer thereof and reacted with said surfactant to form said further insoluble reaction product, both said insoluble reaction product and said further insoluble reaction product forming a recoverable agglomerated material.

2. A composition as claimed in claim 1, wherein said gas is air and is present in an amount of up to about 80% by volume.

3. A composition as claimed in claim 2, wherein the amount of air is comprised between about 5 to about 80% by volume.

4. A composition as claimed in claim 1, wherein said gas bubbles have a size of about 12 to about 20 microns.

5. A composition as claimed in claim 4, wherein said bubbles have a half-life of at least about 1 hour.

6. A composition as claimed in claim 1, wherein said hydrogen-bonded liquid is water.

7. A composition as claimed in claim 6, wherein said surfactant is a water soluble anionic, cationic or non-ionic surfactant.

8. A composition as claimed in claim 7, wherein said surfactant is selected from the group consisting of alkali metal and ammonium lauryl sulfates, polyoxyethylene derivatives of fatty acid partial esters or sorbitol anhydrides and surfactants based on alkylaryl polyether alcohols, sulfonates and sulfates.

9. A composition as claimed in claim 8, wherein said surfactant is a non-ionic surfactant available under the trademark TRITON X-100.

10. A composition as claimed in claim 7, wherein said water soluble surfactant has a HLB ratio of about 16 to about 18.

11. A composition as claimed in claim 7, wherein said gas bubbles have a size of about 12 to less than about 25 microns and wherein said hydration layer further contains an oil soluble surfactant, whereby when said bubbles rupture as a result of the nucleation reaction at said surface layers and of unreacted bubbles having a size above about 15 microns slowly increasing in size and reaching a size of about 25 microns, other unreacted bubbles also rupturing in time as a result of said collector ions having migrated through the respective hydration layer thereof and reacted with said water soluble surfactant, residual globules of said oil soluble surfactant with no residual gas core are formed which have a size of about 1 micron and act as further collectors of any oil soluble materials present in said water, thereby extending the range of materials to be collected.

12. A composition as claimed in claim 7, wherein said hydration layer contains water in the form of soft ice having a viscosity of the order of $10^4$ poises.

13. A composition as claimed in claim 12, wherein said hydration layer contains a plurality of successive layers of polarized water molecules.

14. A composition as claimed in claim 12, wherein said water soluble surfactant is present in an amount equal to about 3 times the critical micelle concentration thereof, whereby said hydration layer is multilayered and contains an innermost mono-molecular layer of surfactant and a double-molecular layer of surfactant spaced therefrom with an inner soft ice layer between said surfactant layers and an outermost soft ice layer surrounding said double-molecular layer of surfactant.

15. A composition as claimed in claim 1, wherein said surfactant is present in an amount at or slightly above critical micelle concentration.

16. A composition as claimed in claim 15, wherein said surfactant is present in an amount of about 100 to about 300 p.p.m.

17. A composition as claimed in claim 15, wherein said surfactant is present in an amount of about 10% above critical micelle concentration.

18. A composition as claimed in claim 1, wherein said surfactant is present in an amount of about 10% less than critical micelle concentration.

19. A composition as claimed in claim 1, wherein said hydration layer has a thickness of about 10 to about 100 Å.

20. A composition as claimed in claim 1, wherein said surface layer of collector ions is positively or negatively charged and acts as a Faraday cage to electrically screen said hydration layer.

21. A composition as claimed in claim 1, wherein the collector providing said collector ions is present in an amount of about 100 to about 500 p.p.m.

22. A composition as claimed in claim 1, wherein said hydrogen-bonded liquid is water and the collector providing said collector ions is a water soluble collector selected from the group consisting of aluminum sulfate, alkali metal hydroxides and bicarbonates.

23. A composition as claimed in claim 22, wherein said collector is aluminum sulfate.

24. A method of preparing a composition for the direct nucleation of materials which are dissolved or suspended in a hydrogen-bonded liquid, which comprises the steps of:
providing a flowing stream comprising a two phase mixture of gas and a solution containing said hydrogen-bonded liquid and a soluble surfactant which has a HLB ratio greater than about 10 and is present in an amount up to about 3 times critical micelle concentration;
imparting to said stream a rotating laminar flow so as to form in said hydrogen-bonded liquid a plurality of micro-vortices centrifugally entraping said gas therein and allowing said micro-vortices to break into surfactant-stabilized spherical gas bubbles, said micro-vortex forming step being carried out under conditions to provide bubbles having a narrowly distributed size in the range of from about 12 to about 100 microns and a half-life of at least about 2 minutes;
providing a time delay so as to allow a hydration layer to completely develop on each of said surfactant-stabilized gas bubbles formed;
adding a collector providing collector ions active to react with said materials and allowing said ions to form an outer surface layer on the respective hydration layer of each said surfacant-stabilized gas bubble, said collector ions being movably held to said hydration layer by Coulomb forces.

25. A method as claimed in claim 24, wherein said gas is air and is present in said mixture in an amount comprised between about 5 to about 80% by volume.

26. A method as claimed in claim 24, wherein said hydrogen-bonded liquid is water.

27. A method as claimed in claim 26, wherein said surfactant is a water soluble anionic, cationic or non-ionic surfactant.

28. A method as claimed in claim 27, wherein said surfactant is selected from the group consisting of alkali metal and ammonium lauryl sulfates, polyoxyethylene derivatives of fatty acid partial esters of sorbitol anhydrides and surfactants based on alkylaryl polyether alcohols, sulfonates and sulfates.

29. A method as claimed in claim 28, wherein said surfactant is a non-ionic surfactant available under the trademark TRITON X-100.

30. A method as claimed in claim 27, wherein said water soluble has a HLB ratio of about 16 to about 18.

31. A method as claimed in claim 27, wherein said mixture further contains an oil soluble surfactant and the micro-vortex forming step is carried out under conditions to provide bubbles having a size of about 12 to less than about 25 microns.

32. A method as claimed in claim 31, wherein said water soluble surfactant and said oil soluble surfactant are present in said mixture in a weight ratio of about 1:1.

33. A method as claimed in claim 27, wherein said water soluble surfactant is present in said solution in an amount equal to about 3 times the critical micelle concentration so as to provide a hydration layer which is multilayered and contains an innermost mono-molecular layer of surfactant and a double-molecular layer of surfactant spaced therefrom with an inner soft ice layer between said surfactant layers and an outermost soft ice layer surrounding said double-molecular layer of surfactant.

34. A method as claimed in claim 24, wherein said surfactant is present in said mixture in an amount at or slightly above critical micelle concentration.

35. A method as claimed in claim 24, wherein said collector is added in an amount of about 100 to about 500 p.p.m.

36. A method as claimed in claim 24, wherein said hydrogen-bonded liquid is water and said collector is a water soluble collector selected from the group consisting of aluminum sulfate, alkali metal hydroxides and bicarbonates.

37. A method as claimed in claim 36, wherein said collector is aluminum sulfate.

38. A method as claimed in claim 24, wherein said micro-vortices are formed in a plurality of pairs of layers, each pair of layers comprising respective first and second layers which are spaced by a distance d, the respective micro-vortices of said first and second layers being spaced relative to one another by a distance l with the micro-vortices of one of said layers being disposed intermediate two successive micro-vortices of the other layer.

39. A method as claimed in claim 38, wherein the distances d and l are selected such that the ratio d/l is equal to about 0.28.

40. A method as claimed in claim 38, wherein said time delay is in the range of from about 10 to about 100 milliseconds.

41. A method as claimed in claim 24, wherein the micro-vortex forming step is carried out by subjecting said stream to micro-vortex forming and shedding means comprising a plurality of spaced apart substantially parallel stationary rods of circular cross-section disposed transversely to the direction of flow, under conditions to provide a Reynolds number in the range of from about 500 to about 5,000.

42. A method as claimed in claim 41, wherein said stream is caused to turbulently flow upstream of said micro-vortex forming and shedding means so as to provide a uniform two phase mixture.

43. A method as claimed in claim 41, wherein said rods have diameters of at least about 0.005 inch.

44. A method as claimed in claim 43, wherein the diameters of said rods are in the range of from about 0.005 to about 0.02 inch so as to provide gas bubbles having a narrowly distributed size in the range of from about 12 to about 100 microns.

45. A method as claimed in claim 43, wherein said rods define a total effective length in the range of from about 100 to about 500 inches.

46. A method as claimed in claim 41, wherein said two phase mixture comprises a mixture of air and water in a volume ratio of about 1:1 containing about 300 p.p.m. of a non-ionic surfactant having a HLB ratio of about 13.5, and wherein the micro-vortex forming step is carried out at a Reynolds number of about 500 using rods having diameters of about 0.005 inch, whereby air bubbles having a size of about 12 to about 20 mircons are obtained.

47. A method as claimed in claim 46, wherein said rods define a total effective length of about 180 inches.

48. A method as claimed in claim 41, wherein said two phase mixture comprises a mixture of air and water in a volume ratio of about 1:1 containing about 300 p.p.m. of a non-ionic surfactant having a HLB ratio of about 13.5, and wherein the micro-vortex forming step is carried out at a Reynolds number of about 500 using rods having diameters of about 0.01 inch, whereby air bubbles having a size of about 20 to about 30 microns are obtained.

49. A method as claimed in claim 48, wherein said rods define a total effective length of about 222 inches.

50. A method as claimed in claim 24, wherein the micro-vortex forming step is carried out by subjecting said stream to micro-vortex forming and shedding means comprising a plurality of radially arranged rods of circular cross-section rotating about a central axis and disposed transversely to the direction of flow, under conditions to provide a Reynolds number in the range of from about 500 to about 5,000.

51. A method as claimed in claim 50, wherein said stream is caused to flow in the form of a macro-vortex upstream of said micro-vortex forming and shedding means.

52. A method as claimed in claim 51, wherein said macro-vortex is caused to rotate in a direction which is the same as the direction of rotation of said rods.

53. A method as claimed in claim 52, wherein said two phase mixture comprises a mixture of air and water in a volume ratio of about 1:1 containing about 300 p.p.m. of a non-ionic surfactant having a HLB ratio of about 13.5, and wherein the micro-vortex forming step is carried out at a Reynolds number of about 500 to about 600 using rods having diameters of about 0.005 inch, whereby air bubbles having a size of about 12 to about 20 microns are produced.

54. A method as claimed in claim 53, wherein said rods define a total effective length of about 3,500 inches.

55. A method as claimed in claim 51, wherein said macro-vortex is caused to rotate in a direction which is opposite the direction of rotation of said rods.

56. A method as claimed in claim 50, wherein said rods have diameters of at least about 0.005 inch.

57. A method as claimed in claim 56, wherein the diameters of said rods are in the range of from about 0.005 to about 0.02 inch so as to provide gas bubbles having a narrowly distributed size in the range of from about 12 to about 100 microns.

58. A method as claimed in claim 56, wherein said rods define a total effective length in the range of from about 1000 to about 10,000 inches.

59. An apparatus for the production of a composition for the direct nucleation of materials which are dissolved or suspended in a hydrogen-bonded liquid, which comprises:
   first feed means for providing a flowing stream comprising a two phase mixture of gas and a solution containing said hydrogen-bonded liquid and a soluble surfactant which has a HLB ratio greater than about 10 and is present in an amount up to about 3 times critical micelle concentration;
   micro-vortex forming and shedding means arranged in the flow path of said stream for imparting to said stream a rotating laminar flow so as to form in said hydrogen-bonded liquid a plurality of micro-vortices which centrifugally entrap said gas therein and break into surfactant-stabilized spherical bubbles having a narrowly distributed size in the range of from about 12 to about 100 microns and a half-life of at least about 2 minutes;
   means for providing a time delay so as to allow a hydration layer to completely develop on each of said surfactant-stabilized gas bubbles formed; and
   second feed means for adding a collector providing collector ions active to react with said materials such that said ions form an outer surface layer on the respective hydration layer of each said surfactant-stabilized gas bubble and are movably held to said hydration layer by Coulomb forces.

60. An apparatus as claimed in claim 59, wherein said micro-vortex forming and shedding means comprises a plurality of spaced apart substantially parallel stationary rods of circular cross-section disposed transversely to the direction of flow and adapted to provide a Reynolds number in the range of from about 500 to about 5,000.

61. An apparatus as claimed in claim 60, wherein said rods have diameters of at least about 0.005 inch.

62. An apparatus as claimed in claim 61, wherein the diameters of said rods are in the range of from about 0.005 to about 0.02 inch.

63. An apparatus as claimed in claim 61, wherein said rods define a total effective length in the range of from about 100 to about 500 inches.

64. An apparatus as claimed in claim 63, wherein the total effective length defined by said rods is in the range of from about 200 to about 300 inches.

65. An apparatus as claimed in claim 63, wherein said rods have diameters of about 0.005 inch and define a total effective length of about 180 inches.

66. An apparatus as claimed in claim 63, wherein said rods have diameters of about 0.005 inch and define a total effective length of about 222 inches.

67. An apparatus as claimed in claim 60, wherein said first feed means comprises a conduit for carrying said flowing stream, said conduit being provided with inlet means for said gas and said solution, and means for mixing said gas with said solution to provide a combined flow thereof.

68. An apparatus as claimed in claim 67, wherein said mixing means include baffle means in said conduit to cause said stream to turbulently flow upstream of said micro-vortex forming and shedding means.

69. An apparatus as claimed in claim 60, wherein said micro-vortex forming and shedding means comprises a plurality of rods of circular cross-section radially arranged for rotation about a central axis and disposed transversely to the direction of flow, said rods being adapted to provide a Reynolds number in the range of from about 500 to about 5,000, and drive means for rotating said rods about said central axis.

70. An apparatus as claimed in claim 69, wherein said rods have diameters of at least about 0.005 inch.

71. An apparatus as claimed in claim 70, wherein the diameters of said rods are in the range of from about 0.005 to about 0.02 inch.

72. An apparatus as claimed in claim 70, wherein said rods define a total effective length in the range of from about 1,000 to about 10,000 inches.

73. An apparatus as claimed in claim 72, wherein said rods have diameters of about 0.005 inch and define a total effective length of about 3,500 inches.

74. An apparatus as claimed in claim 69, wherein said first feed means comprises a conduit for carrying said flowing stream, said conduit being provided with inlet means for said gas and said solution, and means for mixing said gas with said solution to provide a turbulent combined flow thereof in the form of a macro-vortex upstream of said micro-vortex forming and shedding means.

75. An apparatus as claimed in claim 74, further including means in said conduit for causing said macro-vortex to rotate in a direction which is the same as the direction of rotation of said rods.

76. An apparatus as claimed in claim 74, further including means in said conduit for causing said macro-vortex to rotate in a direction which is opposite the direction of rotation of said rods.

77. An apparatus as claimed in claim 74, wherein said conduit is provided with an angularly bent portion adapted to impart to said stream a counter-rotating double macro-vortex, means being provided downstream of said angularly bent portion whereby to select one of the macro-vortices of said double macro-vortex, and at least one further angularly bent portion downstream of said selecting means adapted to increase the rotational velocity of said selected macro-vortex, said selected macro-vortex having an eye.

78. An apparatus as claimed in claim 77, wherein said gas inlet means is located downstream of said at least one further angularly bent portion and is adapted to inject said gas into the eye of said selected macro-vortex.

79. An apparatus as claimed in claim 59, wherein said micro-vortex forming and shedding means has outlet means for discharging said surfactant-stabilized gas bubbles, and wherein said time delay means comprises a conduit connected to said outlet means and having a length sufficient to provide a time delay in the range of from about 10 milliseconds to about 100 milliseconds.

80. A bubble generator for producing a mixture of surfactant-stabilized spherical gas bubbles having a narrowly distributed size and dispersed in a hydrogen-bonded liquid, which comprises:

feed means for providing a flowing stream comprising a two phase mixture of said gas and a solution containing a stabilizing amount of said surfactant in said hydrogen-bonded liquid; and micro-vortex forming and shedding means comprising a plurality of rods arranged in the flow path of said stream and disposed transversely to the direction of flow for imparting to said stream a rotating laminar flow so as to form in said hydrogen-bonded liquid a plurality of micro-vortices which centrifugally entrap said gas therein and break into surfactant-stabilized spherical bubbles of a narrowly distributed size, said rods being adapted to provide a Reynolds number in the range of from about 500 to about 5,000.

81. A bubble generator as claimed in claim 80, wherein said rods define a total effective length in the range of from about 100 to about 10,000 inches.

82. A bubble generator as claimed in claim 80, wherein said rods are spaced apart substantially parallel stationary rods of circular cross-section.

83. A bubble generator as claimed in claim 82, wherein said rods have diameters of at least about 0.005 inch.

84. A bubble generator as claimed in claim 83, wherein the diameters of said rods are in the range of from about 0.005 to about 0.02 inch.

85. A bubble generator as claimed in claim 80, wherein said rods have a circular cross-section and are radially arranged for rotation about a central axis, drive means being provided for rotating said rods about said central axis.

86. A bubble generator as claimed in claim 85, wherein said rods have diameters of at least about 0.005 inch.

87. A bubble generator as claimed in claim 86, wherein the diameters of said rods are in the range of from about 0.005 to about 0.02 inch.

88. A bubble generator as claimed in claim 85, wherein said feed means comprises a conduit for carrying said flowing stream, said conduit being provided with inlet means for said gas and said solution, and means for mixing said gas with solution to provide a turbulent combined flow thereof in the form of a macro-vortex upstream of said micro-vortex forming and shedding means.

89. A method of treating water containing dissolved or suspended materials to separate said materials therefrom, which comprises turbulently mixing said water with a composition as defined in claim 7 so as to cause nucleation of said materials at said surface layers of said bubbles, whereby the reaction between said collector ions and said materials causes said bubbles to rupture and to release their entrapped gas as naked gas bubbles and forms an insoluble reaction product, said ruptured bubbles exposing the surfactant contained in the respective hydration layer thereof for reaction with any unreacted collector ions to form a further insoluble reaction product, any unreacted bubbles also rupturing in time as a result of said collector ions having migrated through the respective hydration layer thereof and reacted with said surfactant to form said further insoluble reaction product, and allowing both said insoluble reaction product and said further reaction product to separate from said water as a recoverable agglomerated material.

90. A method as claimed in claim 89, wherein the treated water containing said insoluble reaction product and said further insoluble reaction product is passed to a quiescent flotation chamber wherein both said reaction products are allowed to separate as a floc which is buoyed to the surface of the water with large gas bubbles formed by the coalescence of said naked bubbles with one another.

91. A method as claimed in claim 90, wherein use is made of a composition in which some of said encapsulated gas bubbles contain in the respective hydration layer thereof an amount of said surfactant which is slightly less than critical micelle concentration, whereby said bubbles release more readily their entrapped gas so as to assist in the flotation of said reaction products.

92. A method as claimed in claim 90, wherein the pH of said water containing said materials is adjusted prior to being turbulently mixed with said composition.

93. A method as claimed in claim 92, wherein said pH adjustment is effected by adding to said water a water soluble salt which also reacts with the collector providing said collector ions, whereby a water repellant floc is obtained.

94. A method as claimed in claim 93, wherein said water soluble salt is sodium hydroxide and said collector is aluminum sulfate.

95. A method as claimed in claim 89, wherein the treated water containing said insoluble reaction product and said further insoluble reaction product is passed to a settlement chamber hving a bottom, wherein at least said insoluble reaction product is allowed to separate under gravity to form a sediment layer at the bottom of said chamber.

96. A method as claimed in claim 89, wherein use is made of a composition in which said gas is air, said surfactant is a non-ionic surfactant having a HLB ratio of about 13.5 and in which said air bubbles have a narrowly distributed size in the range of from about 12 to about 20 microns.

97. A method as claimed in claim 96, wherein said composition contains aluminum sulfate as collector providing said collector ions.

98. A method as claimed in claim 89, wherein use is made of a composition in which said gas bubbles have a size of about 12 to less than about 25 microns and in which the respective hydration layer of said bubbles contains in addition to a water soluble surfactant an oil soluble surfactant, whereby when said bubbles rupture as a result of the nucleation reaction at said surface layers and of unreacted bubbles having a size above about 15 microns slowly increasing in size and reaching a size of about 25 microns, other unreacted bubbles also rupturing in time as a result of said collectors ions having migrated through the respective hydration layer thereof and reacted with said water soluble surfactant, residual globules of said oil soluble surfactant with no residual gas core are formed which have a size of about 1 micron and act as further collectors of any oil soluble materials present in said water, thereby extending the range of materials to be collected.

* * * * *